Dec. 20, 1960

C. P. TAYLOR 2,965,021

STENCILLING MACHINE

Filed Feb. 14, 1958

INVENTOR,
CHARLES P. TAYLOR.

BY Lawrence H. Cohn
Frank B. Powell
ATTORNEYS.

Dec. 20, 1960

C. P. TAYLOR 2,965,021

STENCILLING MACHINE

Filed Feb. 14, 1958

INVENTOR,
CHARLES P. TAYLOR.

BY Lawrence H. Cohn
Frank B. Powell

ATTORNEYS.

INVENTOR,
CHARLES P. TAYLOR.
BY Lawrence H. Cohn
Frank B. Powell
ATTORNEYS.

Dec. 20, 1960　　　　　　　C. P. TAYLOR　　　　　　2,965,021
STENCILLING MACHINE

Filed Feb. 14, 1958　　　　　　　　　　　　　　7 Sheets-Sheet 5

INVENTOR,
CHARLES P. TAYLOR.

BY Lawrence H. Cohn
Frank B. Powell
ATTORNEYS.

Dec. 20, 1960

C. P. TAYLOR 2,965,021

STENCILLING MACHINE

Filed Feb. 14, 1958

INVENTOR,
CHARLES P. TAYLOR.
BY Lawrence H. Cohn
Frank B. Powell
ATTORNEYS.

Dec. 20, 1960

C. P. TAYLOR
STENCILLING MACHINE 2,965,021

Filed Feb. 14, 1958

INVENTOR,
CHARLES P. TAYLOR.
BY *Lawrence H. Cohn*
*Frank B. Powell*
ATTORNEYS.

United States Patent Office 2,965,021
Patented Dec. 20, 1960

2,965,021
STENCILLING MACHINE

Charles P. Taylor, Belleville, Ill., assignor to Ideal Stencil Machine Company, Belleville, Ill., a corporation of Illinois Filed Feb. 14, 1958, Ser. No. 715,259

22 Claims. (Cl. 101—123)

This invention relates generally to improvements in a stencilling machine, and more particularly to an improved machine that provides fully automatic stencilling operation.

It is an important objective of the present invention to provide an automatic stencilling machine particularly adapted for assembly line operation, such machine materially reducing labor costs in marking addresses or contents, eliminating shipping bottlenecks since it can be adjusted to correspond to production rate of any automatic packaging or sealing equipment, and reducing the cost of supplies by elimination of waste and unneeded marking equipment.

An important object is realized by the structural arrangement and connection of the stencilling head to the structural mechanism adapted to move the head operatively toward and away from the article to be stencilled, and by the construction of such mechanism which enables fast, accurate and efficient stencilling operation.

Another important objective is achieved by the provision of an electrical circuit having a main operating switch disposed in the path of the article to be stencilled which is adapted upon engagement with such article to actuate means for selectively retaining the article in operative position relative to the stencilling head, and to actuate means for moving the head toward the article for marking purposes.

Other important advantages are realized by the provision of a power-check switch carried by the stencilling head adapted to engage the article to actuate an electrical circuit for slowing the movement of the head toward the article, and by the provision of an automatic return switch carried by the head and actuated upon engagement of the head with the article to condition an electrical circuit for determining the time period the head is maintained in operative position relative to the article for marking operation, and for actuating means to move the head away from the article after elapse of the predetermined time period.

Still another important object is realized by the provision of improved means for transporting an article into the path of the stencilling head, for retaining the article in a precise marking position relative to the head for a period to complete stencilling operation, and then for transporting the article out of the path of the head upon completion.

Yet another important object is provided by an electrical circuit having a switch located in the path of the article being transported and adapted upon engagement with the article to cause actuation of article-positioning means for selectively positioning the article with respect to the head for marking, and by an electrical circuit having a switch carried by the head and adapted upon disengagement with the article to cause actuation of the article-positioning means to effect release of the article.

Another important object is realized by the improved structural arrangement of the positioning-and-retaining means on the conveyor, and of the switching means for operatively connecting the retaining means in predetermined timed relation to the head, conveyor and the article transported on the conveyor.

Another important object is to provide an improved stencilling mechanism carried by the head which operates automatically upon engagement with the article.

Other important advantages are achieved by the provision of a movable safety bar on the head which is adapted to actuate an electrical circuit to maintain the head in operative position with respect to the article for a predetermined time period upon engagement of the bar with the article, and which is adapted to actuate another electrical circuit to return the head to its inoperative position after elapse of the time period.

Another important object is realized by attaching the stencil plate to the safety bar and making it movable therewith into and out of operative relation to the inking means carried by the head, so that the stencil is inked, only when the head operatively engages the article.

The foregoing and numerous other objects and advantages of the invention will more clearly appear from the following detailed description of a preferred embodiment, particularly when considered in connection with the accompanying drawings, in which.

Figure 2:
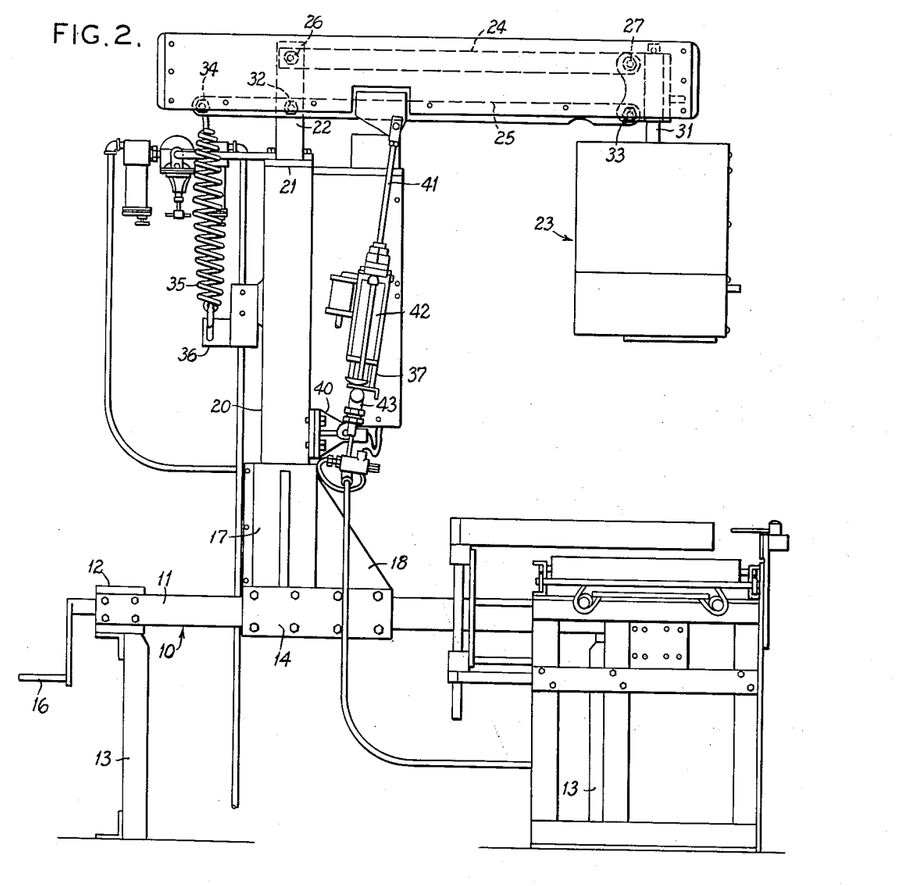
Fig. 2 is a side elevational view of the machine as seen from the left of Fig. 1.
Figure 4:
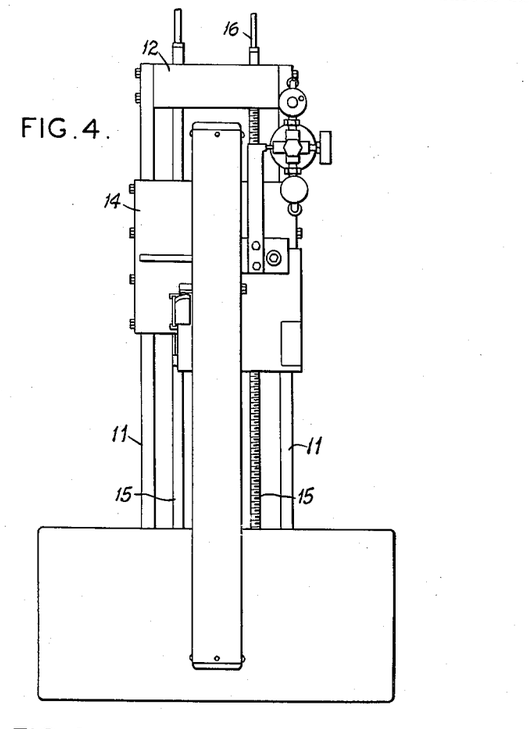
Fig. 4 is a top plan view of the stencilling machine shown in Fig. 1, but with the conveyor structure removed.

The automatic stencilling machine includes a pedestal having a horizontal base frame generally indicated at 10. The base frame 10 consists of spaced side rails 11 attached together at each end by a brace member 12, one of which is shown in Figs. 2 and 4. The base frame 10 is supported from the adjacent surface or floor by a plurality of legs 13, one such leg 13 being located at each corner of the base frame 10.

Mounted on side rails 11 is a movable pedestal base 14, the pedestal base 14 slidably embracing the side rails 11 and being adapted to move longitudinally along the base frame 10. A pair of rods 15 (best seen in Fig. 4) is journalled in the end brace members 12, and one of the rods 15 threadedly engages the pedestal base 14. The rods 15 extend beyond the rear end of the base frame 10 and the threaded rod is connected to crank 16. It is seen that upon rotation of rod 15 by crank 16, the pedestal base 14 can be selectively moved in either direction along base frame 10 to any desired location.

Movable base 14 includes an upstanding socket portion 17 and reenforcing flanges 18. A vertical standard 20 is located within socket portion 17 and is secured to the movable base 14. The top of standard 20 is provided with a plate 21 to which is attached an upstanding rod 22.

The stencilling head referred to generally at 23 is connected to the pedestal standard 20 by an interconnecting arm structure. This arm structure includes a plurality of spaced, parallel bars 24 and 25. Uppermost bar 24 is pivotally connected by pin 26 to vertical pedestal rod 22 and pivotally connected by pin 27 to a sleeve 30 that is attached to a vertical rod 31 fixed to stencilling head 23. Similarly, lower bar 25 is pivotally attached to vertical rod 22 by pin 32 and pivotally attached to sleeve 30 by pin 33. It will be noted particularly that the distance between pivot connections 26 and 27 of bar 24 is identical with the distance between pivot pins 32 and 33 of bar 25, thus assuring a vertical movement of stencilling head 23 upon operation of the arm structure.

Bar 25 is provided with an end portion 34 that is located on the opposite side of pivot pin 32 from stencilling head 23. A compression spring 35 is attached to bar end portion 34 and attached to a plate 36 fixed to standard 20. The spring 35 serves to counterbalance the weight of the stencilling head 23.

A power means is utilized to actuate the arm and stencilling head reciprocally in a vertical direction. This power means includes a main air-actuated cylinder 37 attached at one end to plate 40 fixed to standard 20. The piston of the air-actuated cylinder 37 is connected to bar 25 by an interconnecting rod 41. A second air-actuated cylinder, commonly referred to as a skip-check cylinder 42, is located adjacent main cylinder 37. This skip-check cylinder 42 is similarly connected to the standard 20 and has its piston operatively connected to the arm structure by an interconnecting rod. The skip-check cylinder 42 is located operatively in the fluid line with main cylinder 37 through an adjustable valve 43. The action of the skip-check cylinder 42 opposes the action of the main cylinder 37 and is utilized to slow the descent of stencilling head 23 at a particular stage of operation, all as will be described fully. Valve 43 is adapted to be adjusted conveniently to determine the rate of bleed or flow of the air from the main cylinder 37 to the skip-check cylinder 42.

Figure 1:
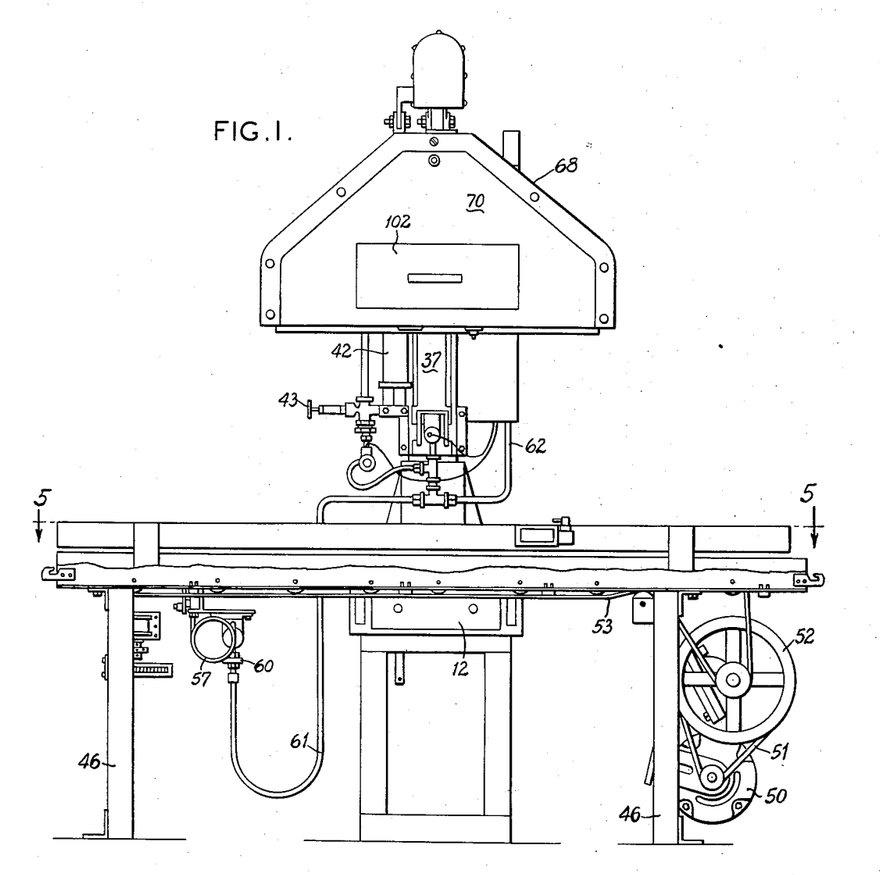
Fig. 1 is a front elevational view of the automatic stencilling machine.
Figure 3:
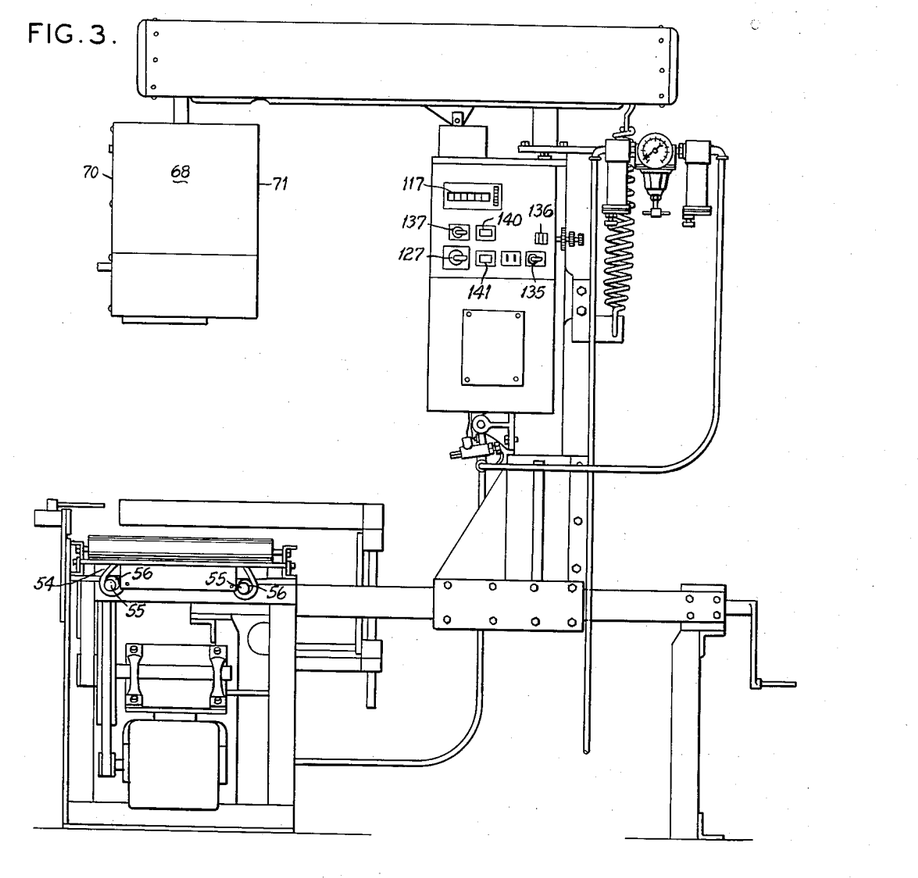
Fig. 3 is a side elevational view of the machine as seen from the right of Fig. 1.
Figure 5:
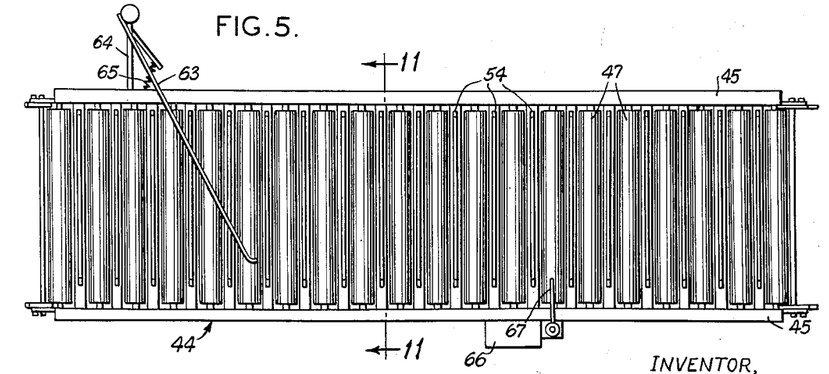
Fig. 5 is a top plan view of the conveyor structure as seen along line 5—5 of Fig. 1.
Figure 6:
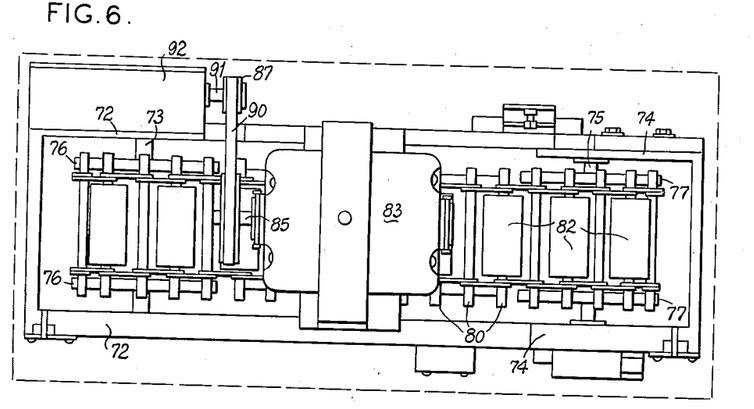
Fig. 6 is a top plan view of the stencilling head with its cover removed.

A conveyor section generally indicated at 44 (Fig. 5) is located immediately below the stencilling head 23 as is illustrated in Figs. 1, 2 and 3. The conveyor section 44 includes spaced longitudinal side rails 45 between which the article to be stencilled moves. These side rails 45 constituting a part of the conveyor frame are supported by leg frames 46 at each end of the conveyor section. Preferably, the leg frames 46 position the conveyor section above the base frame 10 of the pedestal, thus enabling the conveyor section to be placed over the base frame 10 and immediately below the stencilling head 23.

A plurality of rollers 47 are rotatively mounted between side rails 45, the rollers 47 forming a track along which the article to be stencilled is conveyed.

As is best shown in Figs. 1 and 3, a power means is provided on the conveyor section adapted to drive rollers 47. This power means consists of a motor 50 carried by one of the leg frames 46, the motor 50 being operatively connected by drive belt 51, idler pulley 52, and drive belt 53 to rollers 47. The drive belt 53 is disposed about one set of ends of rollers 47, and imparts a rotative motion to the rollers upon actuation of motor 50.

Disposed between each pair of adjacent rollers 47 is a lift plate 54 which constitutes a part of the article-positioning means for holding the article to be stencilled in operative position with respect to the stencilling head 23. A pair of shafts 55 (Fig. 3) are rotatively mounted longitudinally on the conveyor section frame, one such shaft being located at each side of the conveyor section. Each of shafts 55 is provided with a plurality of cams 56 that support the lift plates 54.

An air cylinder 57 operated by electrically operated cylinder valve 60 (Fig. 1) is attached to the conveyor section frame, and is connected by air line 61 to the air line 62 supplying main cylinder 37. The air-actuated piston of air cylinder 57 is connected by a linkage to the shafts 55 and is adapted to oscillate such shafts selectively upon operation. When shafts 55 are disposed in the normal at-rest position shown in Fig. 3, the cams 56 support the lift plates 54 and serve to maintain the plates 54 in a position just below the top level of rollers 47. When shafts 55 are rotatively actuated by air cylinder 57, the cams 56 raise the lift plates 54 above the top level of rollers 47, and hence raise the article to be stencilled off of the rollers and maintain the article in operative position relative to the stencilling head during stencilling operation. When rotatively actuated in the opposite direction by air cylinder 57, the cams 56 lower the lift plates 54 to the initial at-rest position, and hence lower the article on to the rollers 47 for transportation out of the path of the stencilling head 23.

The gate 63 pivotally mounted by a frame 64 attached to the conveyor section 44 is located over the conveyor rollers 47 in the path of the article to be stencilled. The gate 63 tends to urge the article against one of the side rails 45 under the compressive loading of spring 65 as the article moves along the conveyor section, thus assisting in maintaining the articles in alignment on the conveyor section for transportation into and out of the path of the stencilling head 23.

Attached to the conveyor section frame is a switch 66 that has a switch arm 67 extending into the path of the article as it is conveyed along the conveyor section 44. As will be explained more fully subsequently, the article to be stencilled engages the switch arm 67 to actuate an electrical circuit that causes actuation of the main air cylinder 37 for lowering the stencilling head 23 toward and into operative engagement with the article, and at the same time to actuate another electrical circuit adapted to cause actuation of the conveyor mounted air cylinder 57 for raising the lift plates 54 and for holding the article off of rollers 47 in operative position immediately below the stencilling head 23 for stencilling operation.

The stencilling head 23 is provided with a housing formed by a top cover 68, a front panel 70 and a rear panel 71. Located within the housing of head 23 is a frame structure having spaced plates 72 at one end adapted to journal a shaft 73 therebetween, and having a similar pair of spaced plates 74 at the opposite end adapted to journal another transverse shaft 75.

Fixed to shaft 73 is a pair of spaced, coacting sprockets 76, and fixed to shaft 75 is a similar pair of spaced sprockets 77.

A conveyor chain operatively interconnects each pair of sprockets 76 and 77, the conveyor chain consisting of a plurality of transverse pins 80 adapted to bridge the paired sprockets 76 and 77 and adapted to engage the recesses therein. The pins 80 are connected together by a plurality of interconnecting links 81 disposed along each side of the conveyor chain. Rotatively mounted on every other transverse pin 80 is an inking roller 82 adapted to pass between the paired sprockets 76 and 77, the rollers 82 being located between the side links 81.

An electric motor 83 is mounted on a platform 84 fixed to the head frame, the motor 83 being located just beneath the top cover 68 of the head housing. The drive shaft 85 of motor 83 carries a pulley 86 operatively connected to a coacting pulley 87 by a belt 90. The shaft 91 that is attached to pulley 87 is operatively connected to conveyor shaft 73 through a suitable speed reduction unit 92.

Through the above described drive connection, the motor 83 is adapted to rotate shaft 73, and hence operates through the paired sprockets 76 and 77 to drive the inking roller conveyor.

A safety bar 93 extends the length of the head frame at the front of the stencilling head 23. A vertical bar 94 is attached to each end of safety bar 93, the bars 94 being slidably received in socket plates 95 constituting a guide means constraining safety bar 93 to reciprocal movement in a vertical plane while disposed horizontally. A pin 96 is attached to each bar 94 at its uppermost end, the pins 96 engaging the top of the socket plates 95 to preclude withdrawal of the bars 94 from the sockets and to determine the lowermost position of safety bar 93.

Figure 9:
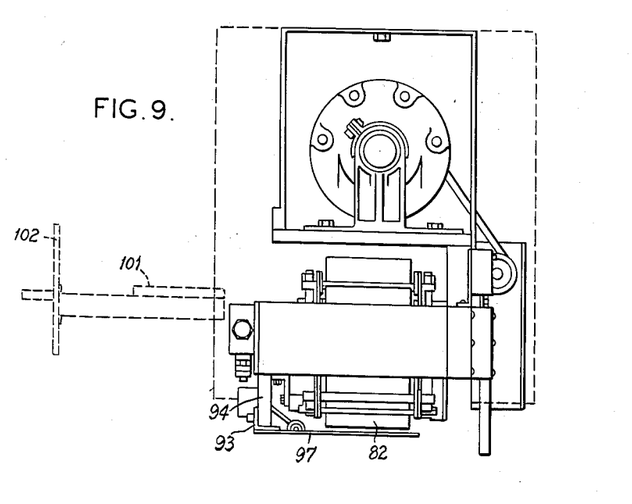
Fig. 9 is an end elevational view of the stencilling head with its housing removed as seen from the right of Fig. 6.

The stencil plate 97, perhaps best shown in Fig. 9, is attached to safety bar 93 and extends immediately below the inking conveyor. When the safety bar 93 is located in its lowermost position, the stencil plate 97 is maintained in spaced relation to the inking rollers 82. However, when safety bar 93 is moved upwardly upon contact with the article to be stencilled, the stencil plate 97 is moved upwardly into operative engagement with the lower flight of inking rollers 82.

Figure 7:
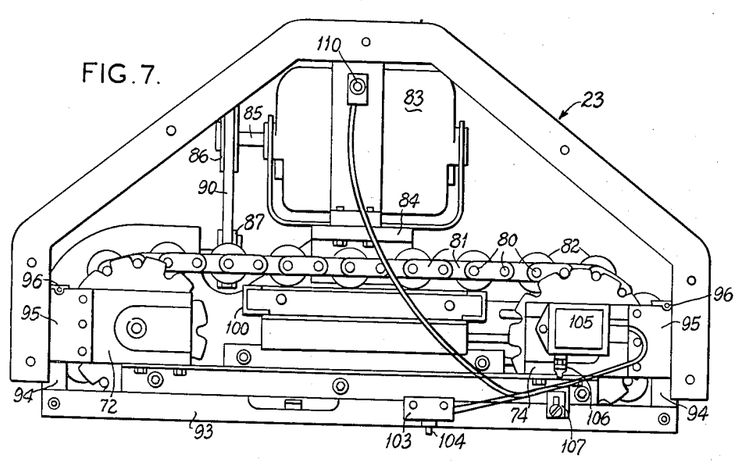
Fig. 7 is a front elevational view of the stencilling head with its front cover removed.

Attached to the head frame and located immediately below the upper flight of inking rollers 82 is a U-shaped channel holder 100, best seen in Fig. 7, adapted to receive an ink pad 101 illustrated in dashed lines in Fig. 9. The ink pad 101 is carried by a removable panel section 102 constituting a portion of the front panel of the stencilling head housing. When ink pad 101 is located in holder 100, the pad 101 is in a position to engage the upper flight of inking rollers 82 as the inking conveyor is actuated. This assembly enables a fresh supply of ink to be applied to every roller. If pad 101 needs additional ink, the panel section 102 together with pad 101 may be conveniently removed from holder 100, and may be as readily replaced.

A power-check switch 103 is attached to safety bar 93, the power-check switch 103 having a depressible switch element 104 normally extending below the level of bar 93. As will be seen subsequently in further description of the electrical diagram of this device (Fig. 10) the power-check switch 103 is connected in electrical circuit with the skip-check cylinder 42. When the switch element 104 engages the article upon lowering of stencilling head 23, the skip-check cylinder 42 that acts in opposition to main air cylinder 37 is actuated which has the effect of slowing down the action of main air cylinder 37, and hence slows the descent of head 23. Because valve 43 can be adjusted to pre-set the amount of bleed from the main air cylinder 37 to the skip-check cylinder 42, it is seen that the stencilling head 23 can be brought to a halt abruptly or slowly.

An automatic return switch 105 is connected to the head frame and includes a switch-actuating element 106 adapted to engage a lug 107 fixed to safety bar 93 when the bar 93 is moved upwardly upon engagement with the article. Upon actuation of automatic return switch 105 by lug 107 and bar 93, the main air cylinder 37 is actuated through an electrical circuit to raise the head 23 upwardly away from the article. It will be particularly noted that the automatic return switch 105 is actuated after the skip-check cylinder 42 is actuated by switch 103. Automatic return switch 105 operates under normal conditions to raise stencilling head 23 after the article has been stencilled. The automatic return switch 105 is connected through a timer in the electrical circuit which provides a pause before actuation of the main cylinder 37 to enable stencilling operation.

For safety reasons, a panic button 110 is carried at the front of the stencilling head 23 which is operatively connected in electrical circuit with the electrically operated valve of main cylinder 37 and adapted to be depressed by the operator in an emergency to raise the stencilling head 23 immediately.

Figure 8:
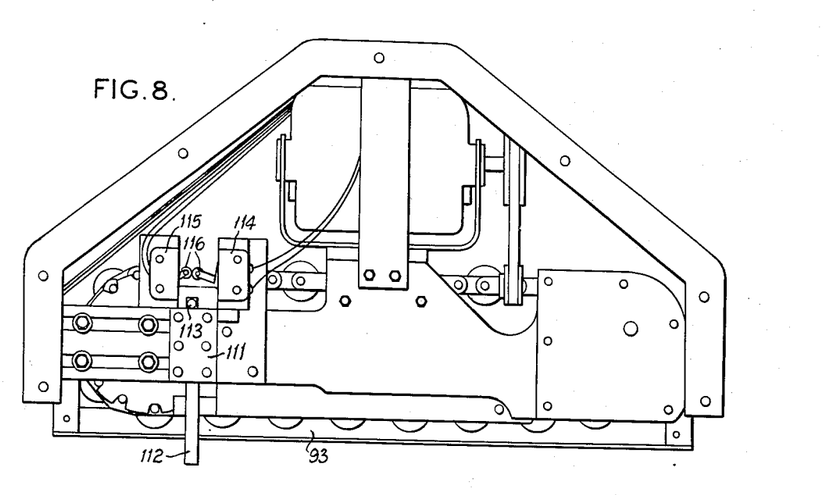
Fig. 8 is a rear elevational view of the stencilling head with the rear cover removed.

Disposed at the rear of the stencilling head as is best shown in Fig. 8, is a production counter mechanism. This mechanism includes a socket plate 111 attached to the head frame at the rear of the head 23, the socket plate 111 being adapted to receive slidably a bar 112. A pin 113 is fastened to the upper end of bar 112 and is adapted to engage the top of socket plate 111 to prevent withdrawal of bar 112 when the stencilling head 23 is raised. In its lowermost position, the bar 112 extends below the safety bar 93.

A pair of switches 114 and 115 is attached to the head frame above the socket plate 111, the switches 114 and 115 being located on opposite sides of counter bar 112 and including switch elements 116 adapted to be engaged by the upper end of bar 112 as the bar is moved upwardly upon engagement with the article to be stencilled. The switches 114 and 115 are of the type that do not actuate their respective electrical circuits upon engagement of switch elements 116 with bar 112 when the bar is moved to its upper position. However, when the bar 112 is automatically lowered as the stencilling head 23 is raised away from the article, the switch elements 116 disengage the bar 112 and hence cause actuation of their respective electrical circuits. Upon operation of automatic production counter switch 114, the production meter 117 is actuated to keep a record of the number of articles stencilled.

The switch 115 is operatively connected through an electrical circuit to the air cylinder 57 carried on the conveyor. When the bar 112 drops as the head 23 is moved away from the article, the switch 115 actuates air cylinder 57 to lower the lift plates below the level of the rollers 47, and hence operates to release the article for movement along the conveyor out of the path of the stencilling head 23.

Figure 10:
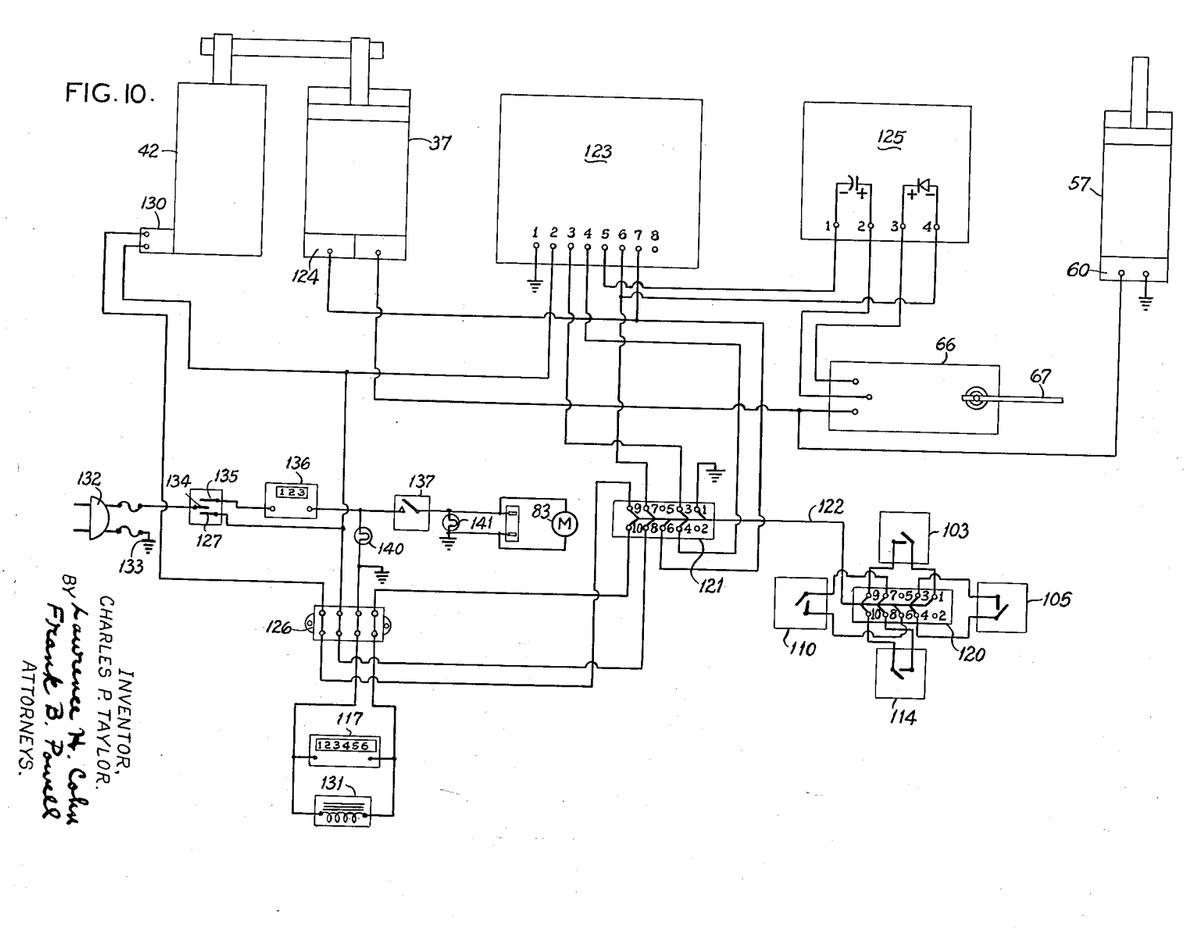
Fig. 10 is a wiring diagram of the electrical circuits and the mechanism which such circuits connect.
Figure 11:
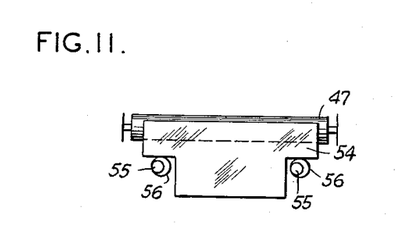
Fig. 11 is a view of the lift plate, roller and cam shafts as seen along line 11—11 of Fig. 5.

The electrical circuit for the automatic stencilling machine is shown in Fig. 10. It is seen that power-check switch 103 is connected to terminals 1 and 9 of plug 120, that the automatic return switch 105 is connected to terminals 3 and 4 of plug 120, that automatic production counter switch 114 is connected to terminals 8 and 10 of plug 120, and that panic switch 110 is connected to terminals 6 and 7 of plug 120. The respective terminals of plug 120 are connected to a corresponding plug 121 by a cable 122.

Terminal 1 of plug 121 is grounded. Terminal 3 of plug 121 is connected to terminal 3 of the timer 123. Terminal 4 of plug 121 is connected to terminal 4 of timer 123. Terminal 6 of plug 121 is connected to terminal 7 of timer 123, and to the electrically operated valve 124 of main air cylinder 37.

Terminal 7 of plug 121 is connected to terminal 6 of timer 123 and to terminal 4 of the voltage intensifier 125, otherwise known as a Pulsa-Pak.

Terminal 6 of plug 121 is connected through terminal board 126 to a continuous power-on switch 127 located on the control panel and to terminal 2 of timer 123 and to the electrically operated valve 130 of the skip-check air cylinder 42.

Terminal 9 of plug 121 is connected through board 126 to the electrically operated valve 130 of skip-check air cylinder 42.

Terminal 10 of plug 121 is connected through terminal board 126 to one side of the total production meter 117 to the automatic production control solenoid 131. The other side of meter 117 and solenoid 131 is grounded through terminal board 126.

The actuating switch 66 mounted on the conveyor is connected to terminals 2 and 3 of the voltage intensifier 125 and is connected to the electrically operated valve 124 of main air cylinder 37 and to the electrically operated valve 60 of the conveyor mounted air cylinder 57.

The plug 132 is grounded as indicated at 133 and is conected to switch element 134 adapted to be placed in circuit with either the continuous power-on switch 127 or the automatic power-on switch 135. Switch 135 is connected to the automatic production control meter and switch 136 and hence is connected to the motor switch 137. Lamp 140 is connected between the meter-switch 136 and the ground and indicates when the meter switch 136 is in circuit and being utilized. The motor 83 is connected to the motor switch 137 and grounded. Lamp 141 is connected between the motor 83 and motor switch 137 and to the ground and serves to indicate when the motor circuit is closed and utilized.

Under normal operating conditions when it is desired to stencil continuously articles moving along the conveyor the switch 127 is closed with switch element 134. When this circuit is closed, the meter 117 will record the number of articles stencilled.

When it is desired to stencil a predetermined number of articles, and no more, the meter-switch 136 is preset at that figure and the switch 135 is closed with switch element 134. As the machine stencils the articles, the meter 136 will diminish as each article is stencilled. When the meter 136 reads zero and the predetermined articles are stencilled, the switch of meter 136 will operate to open the circuit and halt operation of the stencilling machine.

In utilizing the automatic stencilling machine, either the continuous power-on switch 127 or the automatic power-on switch 135 is closed. Let us assume for purposes of description of operation that the continuous power-on switch 127 is closed. Then the motor switch 137 is closed to actuate motor 83, and thus causes continuous operation of the conveyor of inking rollers 82.

As the articles to be stencilled are moved along the conveyor under the driving action of conveyor rollers 47, each article in turn will engage the switch arm 67 of the actuating switch 66 located operatively in the path of the article. Upon engagement of actuating switch 66, the switch 66 conditions an electrical circuit to operate the electrically operated valve 124 and hence operate main air cylinder 37 to cause a lowering of the stencilling head 23. The voltage intensifier 125 is connected to this electrical circuit and causes a momentary surge of power to effect quick operation of the electrically operated valve 124.

Simultaneously, the actuating switch 66 conditions another circuit to cause operation of electrically operated valve 60 and hence effect operation of the air cylinder 57. As explained previously, the air cylinder 57 causes a raising of the lift plates 54 above the top level of conveyor rollers 47. Thus, the plates 54 lift the article to be stencilled off of the rollers 47 and retain the article in the path of the descending head 23.

As the stencilling head 23 moves downwardly toward the article to be stencilled, the switch element 104 of power-check switch 103 first engages the article, thus conditioning an electrical circuit to cause operation of the electrically operated skip-check valve 130 and hence effect operation of the air-operated skip-check cylinder 42. As explained previously, the skip-check air cylinder 42 operatively opposes the operation of the main air cylinder 37 and slows the descent of stencilling head 23.

Almost immediately upon actuation of power-check switch 103, the safety bar 93 engages the article and is depressed upwardly in its slidable mounting. Because the stencilling plate 97 is carried by safety bar 93, the stencilling plate 97 is moved upwardly relatively to the inking rollers 82. In this position the stencilling plate 97 rests against the article, and the lower flight of inking rollers 82 engage the stencilling plate 97 to mark the article.

As the safety bar 93 is moved upwardly in its slidable mount, the lug 107 engages the switch element 106 of the automatic return switch 105, thus conditioning an electrical circuit for operating timer 123 to determine the time period for stencilling and for actuating the electrically operated valve 124 to cause operation of main air cylinder 37 after elapse of the time period, whereby to effect raising of the stencilling head 23 away from the article.

As the stencilling head moves upwardly, the bar 112 falls downwardly relative to switches 114 and 115, after previously pre-setting such switches when the head 23 engages the article to be stencilled. Upon disengagement of bar 112 with switch element 116 of switch 114, an electrical circuit is conditioned by switch 114 to effect operation of counter-solenoid 131 and hence effect operation of counter meter 117.

At the same time, upon disengagement of bar 112 from switch element 116 of switch 115, an electrical circuit is actuated to operate electrically operated valve 60 of air cylinder 57 carried on the conveyor. Upon operation of air cylinder 57, the lift plates 54 are lowered below the top level of conveyor rollers 47, thus lowering the article on the rollers 47 for movement out of the path of the stencilling head and for movement of the next article on the conveyor into the path of the stencilling head 23.

In this lifting operation of stencilling head 23, the voltage intensifier 125 is in electrical circuit with electrically operated valves 124 and 60 to cause a momentary surge of power for quick operation.

As the head 23 is moved away from the article, the safety bar 93 drops to its lowermost position, thus moving the stencilling plate 97 away from the lower flight of inking rollers 82. At the same time, lug 107 disengages the switch element 106 of automatic return switch 105, and the switch element 104 of power-check switch 103 operatively disengages the article.

Movement of the next article on the conveyor into the path of stencilling head 23 and engagement of the article with the actuating switch 66 causes a repeat of the above described cycle of operation.

If an operator's hand were to be placed between the safety bar 93 and the article to be stencilled upon lowering of the stencilling head 23, the operator's hand would cause movement of bar 93 upwardly and cause actuation of the automatic return switch 105. This action would cause a raising of the stencilling head 23 by actuation of the main air cylinder 37 by switch 105.

As an additional safety feature, if it is desired to raise the stencilling head 23 immediately at any time during the cycle of its operation, the panic switch 110 may be depressed to cause actuation of main air cylinder 37 for raising head 23.

Although the invention has been described by making detailed reference to a single preferred embodiment, such detail is to be understood in an instructive, rather than in any restrictive sense, many variants being possible within the scope of the claims hereunto appended.

I claim as my invention:

1. In a stencilling machine, a pedestal, an arm pivotally connected to said pedestal, a stencilling head attached to the arm at one side of its pivotal connection, a counterbalance attached to the arm at the other side of its pivotal connection, power means connected to said arm for raising and lowering said head about said pivotal connection, said arm including means holding the head in stencilling position throughout its path of travel, and an electrical circuit operatively connected to said power means, said electrical circuit including a first switch adapted to engage the article to be stencilled for actuating said power means to lower the head, and a second switch carried by the head and adapted for engagement of the article by the head to actuate said power means to raise said head.

2. In a stencilling machine, a pedestal, an arm pivotally connected to said pedestal, a stencilling head attached to the arm at one side of its pivotal connection, power means attached to said arm for raising and lowering said head about said pivotal connection, the arm consisting of a pair of bars hingedly connected to said pedestal and hingedly connected to said head, said bars being maintained in parallel relation and being of the same length between said hinge connections, said parallel bars holding the head in stencilling position throughout its path of travel, and an electrical circuit operatively connected to said power means, said electrical circuit including a first switch adapted to engage the article to be stencilled for actuating said power means to lower the head, and a second switch carried by the head and adapted upon engagement of the article by the head to actuate said power means to raise said head.

3. In a stencilling machine, a pedestal, an arm pivotally connected to said pedestal, a stencilling head attached to the arm at one side of its pivotal connection, power means connected to said arm for raising and lowering said hear, a track member along which the article to be stencilled is conveyed into the path of said head, and an electrical circuit operatively connected to said power means, said electrical circuit including a first switch mounted on the track member in the path of the article, said first switch being adapted to engage the article for actuating said power means to lower the head, and a second switch carried by the head, a bar movably mounted within limits on said head and adapted to engage the article when the head is lowered so as to be moved to one limit to actuate said second switch so as to actuate said power means to raise said head.

4. In a stencilling machine, a pedestal, an arm pivotally connected to said pedestal, a stencilling head attached to the arm at one side of its pivotal connection, fluid-actuated means connected to said arm for raising and lowering said head about said pivotal connection, a conveyor including rollers for moving articles to be stencilled into the path of said head, lift means on the conveyor for raising the article off said rollers in the path of said head as the head is lowered, a first switch mounted on the conveyor in the path of the article, and an electrical circuit operatively connecting the first said switch with said lift means, and an electrical circuit operatively connecting said first switch with said fluid-actuated means, said first switch being adapted to engage the article for actuating said fluid-actuated means to lower the head toward the article and for actuating said lift means to raise the article off of said rollers.

5. In a stencilling machine, a pedestal, an arm pivotally connected to said pedestal, a stencilling head attached to the arm at one side of its pivotal connection, power means connected to said arm for raising and lowering said head about said pivotal connection, a conveyor including rollers for moving articles to be stencilled into the path of said head, lift elements on said conveyor normally located below the rollers, lift mechanism connected to said lift elements adapted to move the lift elements above and below the rollers, a first switch mounted on the conveyor in the path of the article, an electrical circuit operatively connecting the said first switch with said lift mechanism and with said power means, said first switch being adapted to engage the article for actuating said power means to lower the head and for actuating said lift mechanism to raise the lift elements above the rollers to move the article off of the conveyor rollers, a second switch carried by the head and actuated by engagement of the head with the article, and an electrical circuit connecting said second switch with said power means so that said second switch actuates said power means to raise the head upon engagement of the article by the head.

6. The combination and arrangement of elements as recited above in claim 5, but further characterized by the provision of a third switch carried by the head and actuated by disengagement of the head from the article, an electrical circuit connecting said third switch with said lift mechanism, said third switch actuating said lift mechanism to lower the lift elements and move the article on said rollers upon disengagement of the head from the article.

7. In a stencilling machine, a movable stencilling head, a conveyor for moving the article to be stencilled into the path of said head, means connected to said head for moving the head toward and away from said article, a first switch located in the path of said article, an electrical circuit connecting said first switch with said means for actuating said means to move the head toward the article, and a second switch carried by the head and actuated by the engagement of the head with the article, and an electrical circuit connecting said second switch with said means for actuating said means to move the head away from the article, an article-positioning means associated with said conveyor and adapted to engage the article, said first switch being in an electrical circuit adapted to actuate said article-positioning means upon engagement of said first switch with the article so as to hold the article in the path of said head.

8. The combination and arrangement of elements as recited above in claim 7, but further characterized by the provision of a timer in said circuit actuated by said second switch to determine the period of time the head remains in its operative position relative to said article.

9. In a stencilling machine, a movable stencilling head, a conveyor for moving the article to be stencilled into the path of said head, power means connected to said head for moving the head toward and away from said article, a safety bar slidably mounted on said head, a first switch mounted in the path of said article, an electrical circuit connecting said first switch to said power means, said first switch actuating said power means to move the head toward the article, power-checking means operatively connected to said power-means, a second switch on the safety bar adapted to engage the article, an electrical circuit including said second switch connected to said power-checking means to slow movement of the head toward the article, a third switch on said head, and an electrical circuit including a timer connecting said third switch to said power means, said third switch engaging said safety bar upon engagement of the head and bar with the article for determining the time period the head remains in its operative position relative to the article, and for actuating said power means to move the head away from the article after elapse of the time period.

10. The combination and arrangement of elements as recited above in claim 9, but further characterized by the provision of inking means carried by said stencilling head, and a stencil plate attached to the said safety bar and movable therewith against the inking means upon engagement of the safety bar and head with said article.

11. In a stencilling machine, a movable stencilling head, a conveyor for moving the article to be stencilled into the path of said head, power means connected to said head for moving the head toward and away from said article, a safety bar slidably mounted on the forward end of said head, a first switch attached to the conveyor in the path of the article, an electrical circuit connecting said first switch to said power means, said first switch upon engagement with the article actuating said power means to move the head toward the article, a second switch attached to said safety bar including a switch element projecting ahead of said bar adapted to engage the article for switch actuation, power-checking means operatively connected to said power means, an electrical circuit including said second switch adapted upon actuation of said second switch to operate the power-check means to slow movement of the head toward the article, a third switch attached to the head, an electrical circuit including a timer connecting the said third switch to said power means, the third switch having a switch element disposed in the path of said safety bar and adapted to engage said bar for actuation of the timer to determine the time period the head remains in its operative position relative to the article, and for actuation of said power means to move the head away from the article after elapse of the time period.

12. The combination and arrangement of elements as recited above in claim 11, but further characterized by the provision of inking means carried by the head, and a stencil attached to the safety bar and movable therewith against the inking means upon engagement of the bar with the article.

13. In a stencilling machine, a movable stencilling head, a conveyor for moving the article to be stencilled into the path of said head, power means connected to said head for moving the head toward and away from said article, article-positioning means on the conveyor, a first switch located in the path of said article, an electrical circuit connecting said first switch to said power means, an electrical circuit connecting said first switch to said article-positioning means, said first switch actuating said article-positioning means upon engagement with the article to hold the article in the path of said head, and actuating said power means to move the head toward the article, a second switch carried by the head, an electrical circuit connecting said second switch to said power means, said second switch actuating said power means to move the head away from the article upon engagement of the head with the article, a third switch attached to the head having a switch element adapted to disengage the article upon movement of the head away from the article, an electrical circuit connecting said third switch to said article-positioning means, said third switch actuating the article-positioning means to release the article for movement along the conveyor out of the path of said head upon disengagement of the switch element of said third switch from said article.

14. In a stencilling machine, a movable stencilling head, a conveyor for moving the article to be stencilled into the path of said head, power means connected to said head for moving the head toward and away from said article, a safety bar slidably mounted on said head and adapted to engage said article, article-positioning means on the conveyor, a first switch mounted in the path of said article, an electrical circuit connecting said first switch to said article-positioning means for actuating the article-positioning means upon engagement of the first switch with the article to hold the article in the path of said head, and an electrical circuit connecting said first switch to said power means for actuating said power means to move the head toward the article, a second switch attached to said safety bar and engaging the article upon movement of the head towards the article, a power-check means operatively connected to said power means, an electrical circuit connected to said power-check means and connected to said second switch actuated to slow the movement of the head toward the article, a third switch attached to the head having a switch element disposed in the path of said safety bar, an electrical circuit including a timer connecting said third switch to said power means, said third switch upon engagement with the bar actuating said timer to determine the time period the head remains in operative position relative to the article, and actuating said power means to move the head away from the article after elapse of the time period incident to engagement of the head and bar with the article, a fourth switch attached to the head having a switch element adapted to engage and disengage said article upon movement of the head toward and away from the article, and an electrical circuit connecting said fourth switch to the article-positioning means, said fourth switch actuating said article-positioning means to release the article for movement along the conveyor out of the path of said head upon movement of the head away from the article.

15. In a stencilling machine, a movable stencilling head, a conveyor including rollers for moving the article to be stencilled into the path of said head, lift means on the conveyor for raising the article off of the rollers, a safety bar slidably mounted on said head and adapted to engage said article, power means connected to said head for moving the head toward and away from said article, a first switch mounted on the conveyor in the path of the article, an electrical circuit connecting said first switch to said lift means for actuating said lift means to raise the article off of said rollers upon engagement of the article with the first switch, an electrical circuit connecting said first switch to said power means for actuating said power means to move the head toward the article, a power-check means operatively connected to said power means, a second switch on said safety bar, an electrical circuit operatively connected to said power-check means and connected to said second switch adapted to actuate the power-check means upon engagement of the bar with the article to slow movement of the head toward the article, a third switch on the head actuated by said safety bar upon engagement of the head and bar with the article, and an electrical circuit including a timer connecting said third switch to said power means for actuating said timer to determine the time period the head remains in operative relation to the article, and for actuating said power means to move the head away from the article after elapse of the time period.

16. The combination and arrangement of elements as recited above in claim 15, but further characterized in that the lift means includes a plurality of lift elements disposed between said rollers and normally located below the upper level thereof, by the provision of a power mechanism connected to said lift elements for raising and lowering the lift elements above and below the roller level, the lift mechanism being operatively connected in the electrical circuit to said first switch, and by the provision of a power means connected to said rollers for continuously driving same.

17. The combination and arrangement of elements as recited above in claim 16, but further characterized by the provision of a fourth switch attached to the head having a switch element adapted to engage the article and adapted to actuate the fourth switch upon movement of the head away from the article, and an electrical circuit connecting said fourth switch to said lift mechanism for actuation of said lift mechanism to lower the lift elements below the level of said rollers and to lower the article on said rollers for subsequent movement along the conveyor out of the path of said head.

18. The combination and arrangement of elements as recited above in claim 15, but further characterized by the provision of inking means carried by said head, and by a stencil plate attached to the safety bar and movable therewith against the inking means upon engagement of the bar and head with the article.

19. In a stencilling machine, a stencilling head having a frame, an endless conveyor mounted on said frame, means for driving said conveyor, a plurality of inking elements carried by said conveyor, ink means engaging said inking elements, a bar at the forward end of the head adapted to engage the article to be stencilled, a stencil plate attached to said bar and movable therewith, and guide means slidably mounting said bar to the frame for moving the bar and stencil plate toward and away from said conveyor respectively upon engagement and disengagement of the bar with the article, the stencil plate engaging the inking elements when moved toward the conveyor upon engagement of the bar with the article.

20. The combination and arrangement of elements as recited above in claim 19, but further characterized in that the said ink means engages the inking elements on one flight of the conveyor, and the stencil plate engages the inking elements on the other flight of said conveyor.

21. In a stencilling machine, a stencilling head having a frame, spaced conveyor shafts mounted on said frame, power means for driving one of said shafts, an endless conveyor attached to said shafts, a plurality of inking rollers carried by said endless conveyor, an ink pad engaging the inking rollers of one flight of the conveyor, a bar adapted to engage the article to be stencilled, a stencil plate attached to said bar and movable therewith, and guide means slidably mounting said bar to the frame for moving the bar and stencil plate toward and away from said conveyor, the stencil plate engaging the inking rollers of the other flight of the conveyor when the stencil plate is moved toward the conveyor upon engagement of the bar with said article.

22. In a stencilling machine, a pedestal, an arm pivotally connected to said pedestal, a stencilling head attached to the arm at one side of its pivotal connection, power means connected to said arm for raising and lowering said head, a track member along which the article to be stencilled is conveyed into the path of said head, and an electrical circuit operatively connected to said power means, said electrical circuit including a first switch mounted on the track member in the path of the article, said first switch being adapted to engage the article for actuating said power means to lower the head, and a second switch carried by the head and actuated upon engagement of the article by the head to actuate said power means to raise said head, an article-positioning means associated with said track member and adapted to engage the article, said first switch being in an electrical circuit adapted to actuate said article-positioning means upon engagement of said first switch with the article so as to hold the article in the path of said head.

References Cited in the file of this patent

UNITED STATES PATENTS

| Number | Name | Date |
|---|---|---|
| 625,876 | Ellan | May 30, 1899 |
| 885,287 | Von Philp | Apr. 21, 1908 |
| 1,491,657 | Barnett | Apr. 22, 1924 |
| 2,115,757 | Winslow | May 3, 1938 |
| 2,116,466 | Secoy | May 3, 1938 |
| 2,189,007 | Kessel | Feb. 6, 1940 |
| 2,267,596 | Montague et al. | Dec. 23, 1941 |
| 2,237,058 | Nutt | Apr. 1, 1941 |
| 2,547,554 | Beckelman | Apr. 3, 1951 |
| 2,684,104 | Dessart et al. | July 20, 1954 |
| 2,846,946 | Schwarzberger | Aug. 12, 1958 |